Nov. 13, 1945.  K. A. KOPETZKY  2,388,748
REMOTE RADIO CONTROL
Filed Oct. 18, 1940  3 Sheets-Sheet 1
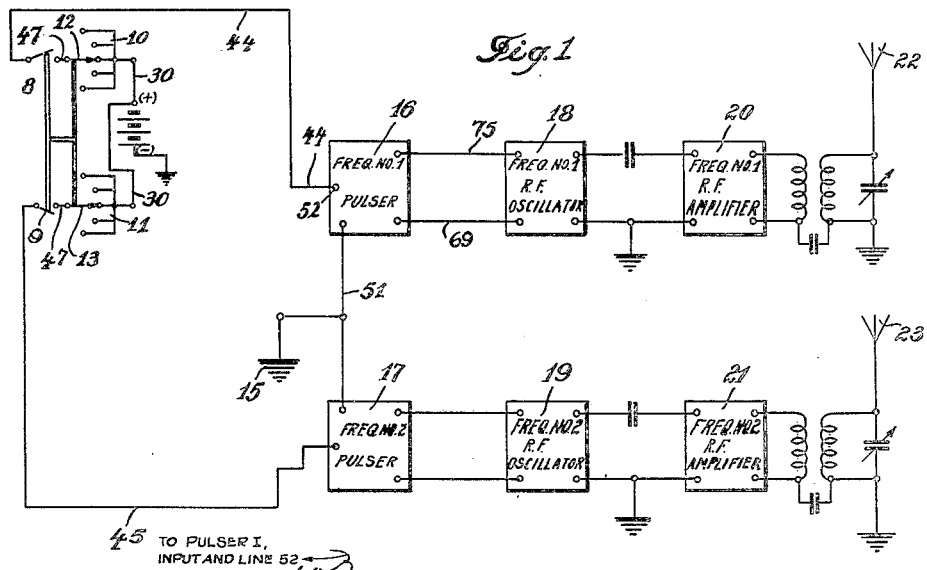
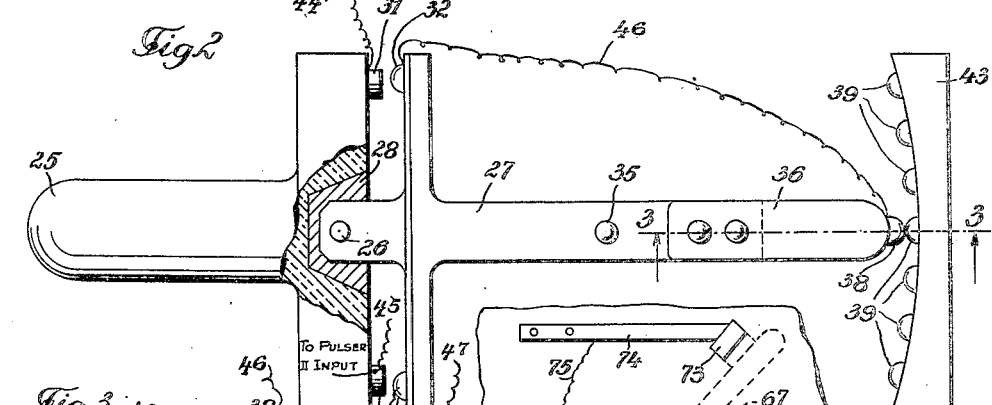
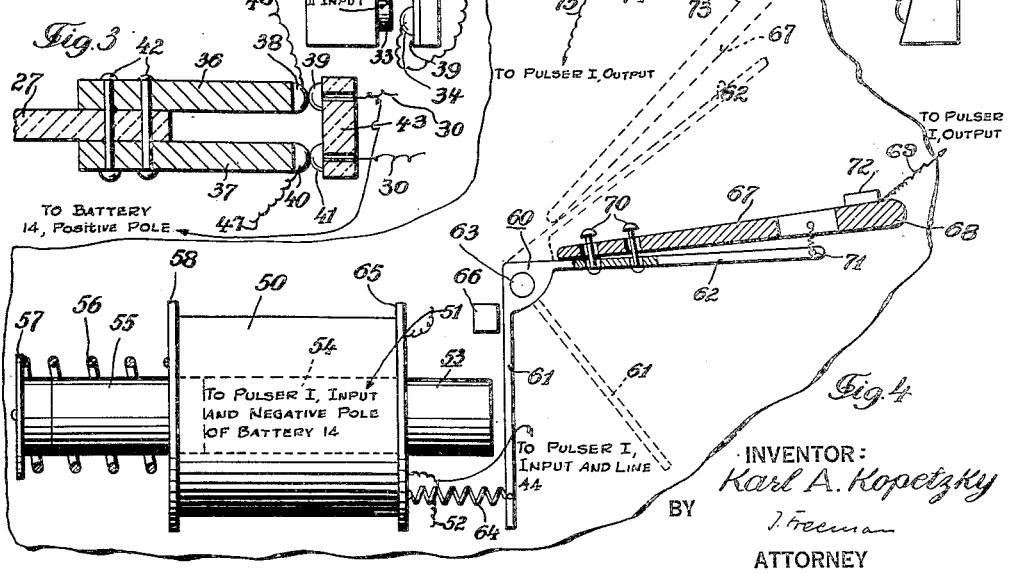
INVENTOR:
Karl A. Kopetzky
BY J. Freeman
ATTORNEY

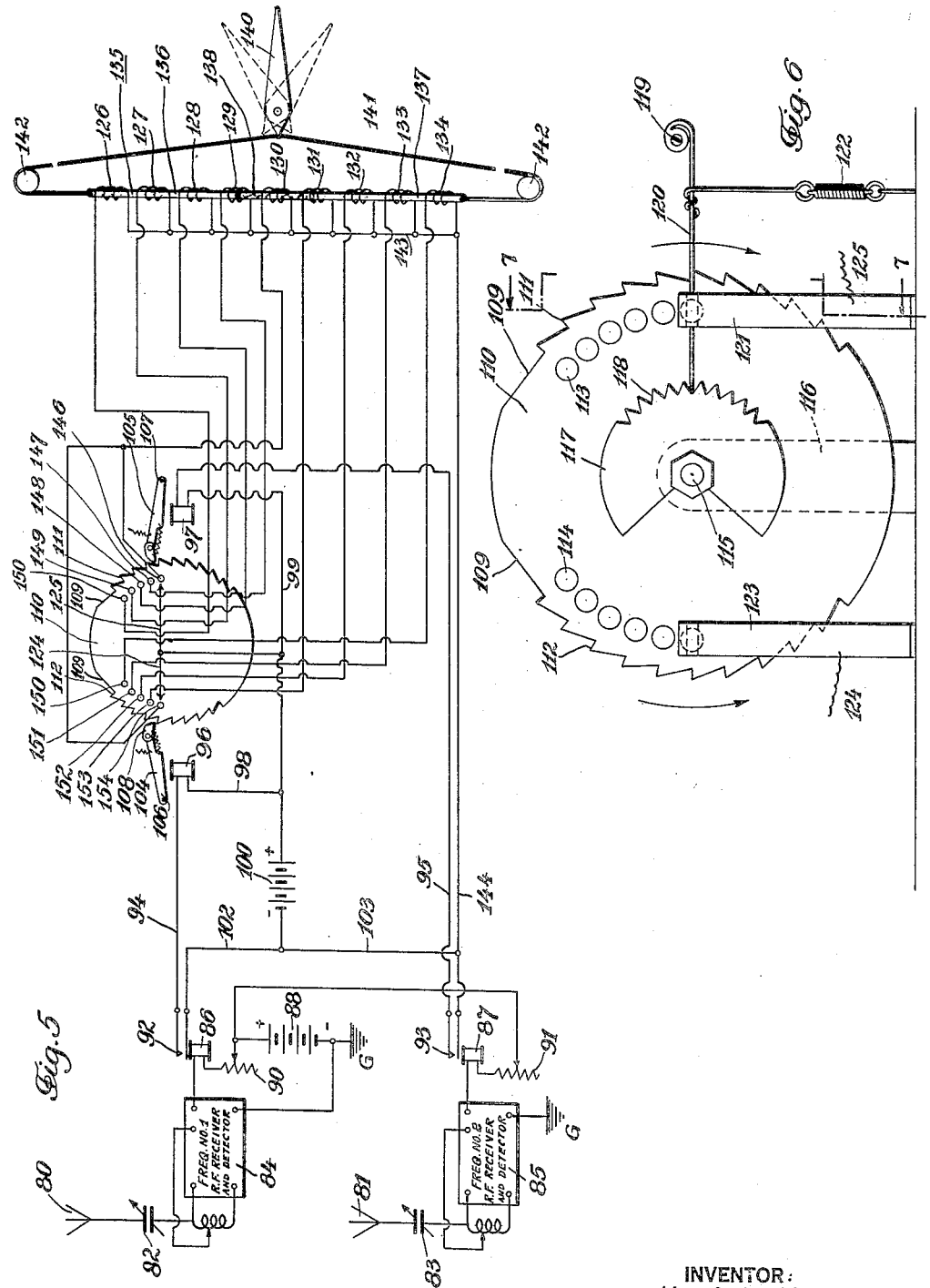

Nov. 13, 1945.  K. A. KOPETZKY  2,388,748
REMOTE RADIO CONTROL
Filed Oct. 18, 1940    3 Sheets-Sheet 3
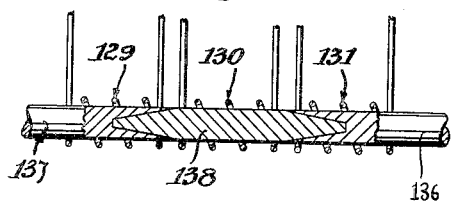
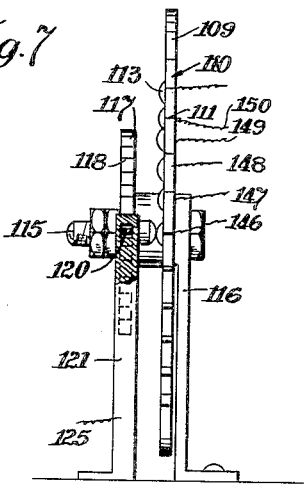
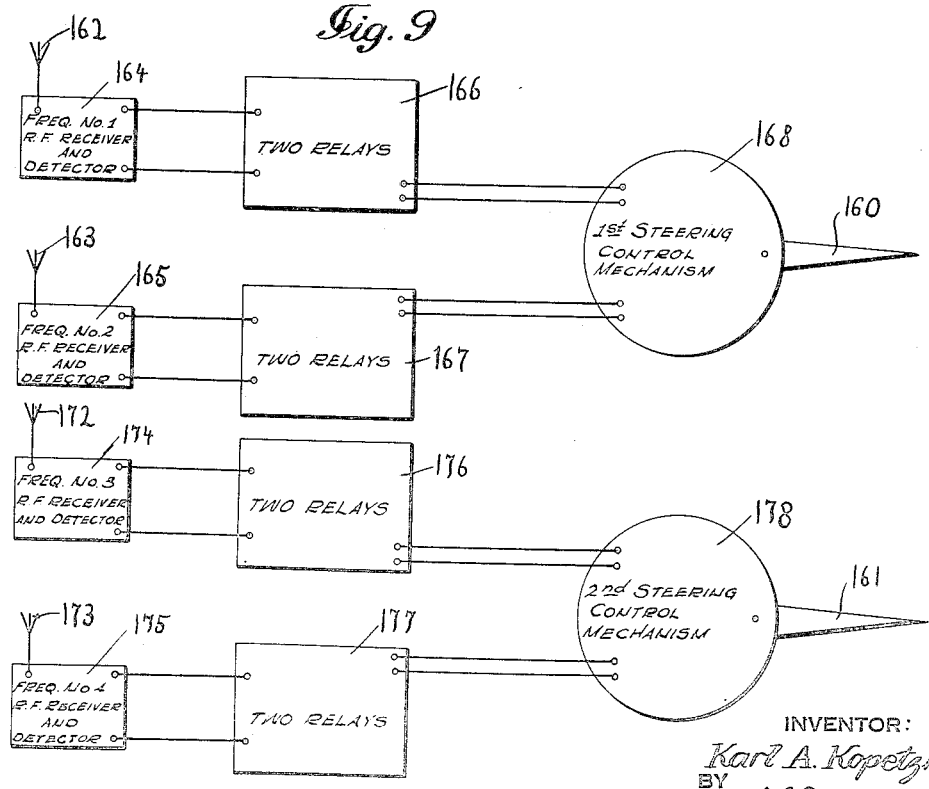
INVENTOR:
Karl A. Kopetzky
BY
E. J. Freeman
ATTORNEY Patented Nov. 13, 1945

2,388,748

UNITED STATES PATENT OFFICE 2,388,748

REMOTE RADIO CONTROL

Karl A. Kopetzky, Chicago, Ill.

Application October 18, 1940, Serial No. 361,654

12 Claims. (Cl. 250—10)

This invention relates to the radio-control, for instance, of mobile vehicles. More particularly the invention is concerned with the remote radio-control of automobiles, submarines, aviation torpedoes, torpedoes of the marine type, aircraft and the like.

Devices for the remote control of models of mobile vehicles by radio have been known heretofore. However, it has been possible to control the steering mechanism of a vehicle, in certain predetermined sequences only. For example if the rudder of a model airplane were set half-right and if it was desired to set the rudder half-left, it has been necessary heretofore to set the rudder first to full right, then to half-right, then to center and finally to half-left. In other words, it was always necessary to set the rudder or any steering mechanism at first to a predetermined normal position and from this normal or rest position the rudder could be set to the desired new position. This procedure is time consuming, complicated and fails to provide full and easy control for complicated maneuvers.

In accordance with my invention, this drawback and others inherent with prior devices are removed. My invention makes it possible to set, for example, the rudder from the full right position immediately to the half right position without moving the rudder first to an intermediate normal or rest position. It is also possible to set the rudder or any other steering mechanism to any desired and predetermined number of positions. This object is achieved by using two different radio frequency transmissions for every steering mechanism to be controlled. One of the two radio frequencies transmission serves to move the mechanism to be controlled in one predetermined direction, while the other radio frequency transmission is used to move the steering mechanism in the opposite direction. Thus, by selectively producing a signal of one of the two predetermined frequencies used, it becomes possible to move the steering mechanism of the mobile vehicle a certain predetermined distance in a selected direction.

In accordance with my invention, a ground radio control or transmitting station is used which, by means of radio frequency oscillators and radio frequency amplifiers, produces a signal of predetermined radio frequencies. For every steering mechanism to be controlled two radio frequency generators are used. By selectively operating one of the two radio frequency generators used for each of the steering mechanisms a wave train of a predetermined length is produced. In order to operate the radio frequency generator for a predetermined length of time and so produce a wave train or signal of predetermined length a novel contact switch or "pulser" control is provided. A control stick or switch serves to select and to operate one of the radio frequency oscillators.

The thus produced wave train is received, detected, and rectified in the vehicle or aircraft to be controlled. The vehicle is provided with one or more antennae serving to receive one of the signals of a different radio frequency produced by the ground station. The received radio signal is rectified and causes the energization of a sensitive but light relay. The sensitive relay in turn through a heavier relay actuates one of two armatures provided for each steering mechanism to be controlled. These two armatures are adapted to rotate a friction braked stepped wheel in two opposite directions.

The stepped wheel is provided with a predetermined number of contacts which correspond to the number of positions to which the steering mechanism is to be set. The contacts of the stepped wheel cooperate with fixed contacts and are adapted to close electric circuits including a current source and a number of solenoids. By selectively energizing one of these solenoids the steering mechanism is controlled by means of a longitudinally displaceable magnetic core attracted by the energized solenoid. Accordingly, by rotating the stepped wheel the selected solenoid is energized and the steering mechanism of a vehicle may thus be controlled.

It is an important feature of this invention that my novel remote radio control will also operate with non-static vehicles. Heretofore it has been necessary to mechanically balance a model airplane to be controlled. In other words, the airplane to be controlled had to fly in a level straight course when all the steering mechanisms thereof were set to their inoperative positions. With my novel remote radio control it is possible to control also non-static airplanes because the steering mechanisms can be set to any desired value to cause the aircraft to fly in a level straight course.

It is, accordingly, an object of the invention to provide a new and improved remote radio-control for the operation of mobile vehicles, such as torpedoes and aircraft.

It is another object of the invention to provide for a remote radio control of multiple steering mechanism of mobile vehicles or aircraft, by using two radio frequency transmissions for each steering mechanism to be controlled.

It is still an object of the invention to provide a novel method for the remote radio control of vehicles or aircraft which will operate also with non-static vehicles.

It is a further object of the invention to provide a novel contact mechanism for a pulser control used with the ground radio transmitting station to produce a radio signal of a predetermined length.

It is still an object of the invention to provide a friction braked wheel which is selectively rotated in either of two directions of rotation by two different radio signals, said wheel controlling a steering mechanism of a vehicle or aircraft.

It is another object of the invention to provide for the remote radio control of a control device in any fixed type of vehicle wherein the control device is to be moved in a horizontal or vertical linear plane.

It is still a further object of the invention to convert a radio impulse as received, into a linear movement of a device to be controlled, and to move the controlled device in that linear direction in a predetermined manner and in either of two directions.

Although I have shown and described certain specific embodiments of my invention, I am fully aware that many modifications thereof are feasible. My invention, therefore, is not to be restricted except insofar as is necessitated by the spirit and scope of the appended claims.

These and further objects of the present invention will become apparent in the following detailed description of a preferred embodiment thereof, taken in connection with the drawings, in which:

Fig. 1 is a diagrammatic representation of the radio transmitting apparatus used for the remote control of any steering mechanism for vehicles.

Fig. 2 is a front elevational view of a control stick adapted to selectively energize either one of two radio frequency oscillators.

Fig. 3 is a section taken on the line 3—3 of Fig. 2.

Fig. 4 is a front elevational view of a contact apparatus and associated parts serving to energize the selected radio frequency generator and to produce a radio signal of predetermined length.

Fig. 5 is a diagrammatic representation of the receiving station and associated mechanisms used for operating a control surface of an airplane.

Fig. 6 is a front elevational view of a friction braked stepped wheel serving to selectively connect one of a plurality of solenoids with a current source in order to shift a rudder controlling magnet core.

Fig. 7 is a sectional view taken on the line 7—7 of Fig. 6.

Fig. 8 is an elevational view partly in section of the rudder controlling magnetic core.

Fig. 9 is a diagrammatic representation of a receiving station used for controlling two maneuvering mechanisms.

Referring more particularly to the drawings, a schematic electric current diagram of the radio transmitting station is shown in Fig. 1. The transmitting station comprises two switch mechanisms shown schematically and designated with 10 and 11. Fingers 12 and 13 of switch mechanism 10 and 11 respectively are connected with the positive pole of a battery 14 which may be connected to ground at 15. Switches 8 and 9 are interposed between switch mechanism 10, 12 and pulser 16, and between switch mechanism 11, 13 and pulser 17, respectively. Switch mechanism 10, 12 connects battery 14 with pulser 16 when switch 8 is closed, while contact mechanism 11, 13 connects battery 14 with pulser 17 in case switch 9 is closed. The switch mechanism comprising elements 10, 12 and 11, 13 as well as switches 8, 9 is shown in Figs. 2 and 3, while one of the two pulsers 16, 17 being both of the same construction is shown in greater detail in Fig. 4.

As will be explained more in detail hereinafter, pulser 16 and pulser 17 serve to close a circuit connection which causes radio frequency oscillators 18 and 19, respectively, to be energized. Radio frequency oscillators 18 and 19 serve to generate radio waves of different frequencies. Radio frequency oscillator 18 is coupled to radio frequency amplifier 20, while radio frequency oscillator 19 is coupled to radio frequency amplifier 21. Amplifiers 20 and 21 may each consist of a pentode and associated circuits and serve to amplify the waves generated by oscillators 18 and 19, respectively. The radio signals produced by oscillator 18 and amplified by amplifier 20 are coupled to antenna 22 which transmits the generated radio frequency signal. The radio signal of a different frequency produced by oscillator 19 and amplified by amplifier 21 is coupled to antenna 23 transmitting the signal.

The control stick shown in Figs. 2 and 3 serves to selectively connect the battery 14 with either pulser 16 or with pulser 17. The control stick comprises a handle 25 rotatably mounted in bearing 26 arranged in cross-shaped member 27. An insulating material such as rubber or Bakelite indicated at 28 is interposed between handle 25 and bearing 26 to prevent the current from flowing directly from handle 25 to cross-shaped member 27. Wire 44 is connected with the input of pulser 16 as shown in Fig. 1. Handle 25 is provided with two insulated contact elements 31 and 33 which are adapted to cooperate with insulated contact elements 32 and 34 provided on the cross-shaped member 27. Contact elements 31, 32 and 33, 34 correspond to switches 8 and 9 respectively. Wire 45 connects contact element 33 with the input of pulser 17 as indicated in Fig. 1. Member 27 is rotatably arranged in pivot 35 mounted in any suitable way not shown in the drawings. The free end of member 27 is provided with two lugs 36 and 37. Lugs 36 and 37 are provided with insulated contact members 38 and 40, respectively. Contact members 38 and 40 cooperate with a plurality of contact members 39 and 41 arranged on base plate 43 on a segment of a circle. The two lugs 36 and 37 are fastened on member 27 by bolts 42. Contact member 32 is electrically connected with contact member 38 on lug 36 by means of wire 46, while contact member 34 is connected by wire 47 with contact member 40 on lug 37 illustrated in Fig. 3. Leads 46 and 47 are also shown in Fig. 1. All the contact elements 39 arranged on base plate 43 are insulated and are connected with each other by wire 30. Wire 30 connects one of the pulsers 16 or 17 with the positive pole of battery 14 as shown in Fig. 1. The second row of contact members 41 on base plate 43 are insulated from base plate 43 and are also connected with each other by wire 30.

By gripping handle 25 of the control stick and rocking the same about pivot 26 either contacts 33 and 34 or contacts 31 and 32 may be connected by means of wire 30 with battery 14. When handle 25 is rocked in a clockwise direction contact member 31 engages with contact member 32 and thus battery 14 is connected through one of the contact members 39 and contact member 38 with pulser 16. By the rocking movement of handle 25 cross-shaped member 27 is also rotated in a clockwise direction about pivot 35. Therefore, contact 38 on lug 36 is moved in a clockwise direction to engage the next contact element 39.

By rocking handle 25 in a counterclockwise direction the contact between contact members 31 and 32 is broken, while contact members 33 and 34 connect battery 14 with pulser 17. By this counterclockwise rocking movement of handle 25 cross-shaped member 27 is also rocked in a counterclockwise direction thus engaging contact member 40 with the next contact member 41 on base plate 43.

Thus it will be evident that by a rocking movement of handle 25 either in a clockwise or in a counterclockwise direction either pulser 16 or pulser 17 will be connected with battery 14. At the same time, the rocking movement of cross member 27 caused by the rocking movement of handle 25 moves contacts 38 and 40 either in a clockwise or in a counterclockwise direction depending upon the movement of handle 25. Hence, the position of the control stick will indicate at every moment the corresponding position of the rudder to be controlled.

The pulsers 16 or 17 indicated diagrammatically in Fig. 1 have both the same construction. One of the two pulsers is shown in greater detail in Fig. 4. Solenoid 50 is connected by wire 51 to one pole of a current source, while wire 52 connects the solenoid with either wires 44 or 45 of Figs. 1 and 2 as the case may be. Wire 51 is connected with ground 15 and the negative pole of battery 14 as illustrated in Fig. 1. Therefore, every time a contact is made between contact elements 31, 32 or 33, 34 either pulser 16 or pulser 17 is energized by energizing solenoid 50. Plunger 53 is slidably arranged within solenoid 50. Plunger 53 consists of a non-magnetic right hand part 54 and of a magnetic core 55. The non-magnetic part of plunger 53 may, e. g., consist of brass, while the magnetic core 55 may consist of iron or any suitable magnetizable alloy. Spring 56 is arranged between flange 57 of plunger 53 and front wall 58 of coil 50. Spring 56 tends to normally keep the iron section 55 of plunger 53 out of coil 50. Angle lever 60 having a vertically arranged arm 61 and a horizontally arranged arm 62 is rotatable about pivot 63. Spring 64 fastened on lever arm 61 and on front piece 65 of coil 50 pulls lever 60 against stop 66. Rod 67 weighted at its end with a heavy metal portion 68 is loosely connected with lever arm 62 by lugs 70. Spring 71 fixed on lever arm 62 and on rod 67 tends to pull hammer lever 67 against lever arm 62. Contact element 72 provided at the end of rod 67 is connected by wire 69 with a suitable current source not shown in the drawings. Lead 69 connects the output of pulser 16 to the input of oscillator 18 as indicated in Fig. 1. Contact member 72 is adapted to cooperate with contact member 73 arranged on ledge 74. Contact member 73 is connected by means of wire 75 with the other pole of the current source to connect pulser 16 with oscillator 18.

When coil 50 is energized by the actuation of the control stick shown in Figs. 2 and 3, core 55 is pulled into coil 50. This movement causes the right hand end of plunger 53 to impact upon lever arm 61 which is thereupon rotated in a counterclockwise direction and against the action of spring 64. Lever arm 61 now assumes the position shown in dotted lines. The movement of loosely attached hammer lever 67, however, continues beyond the movement of lever arm 62 shown in dotted lines. This is due to the inertia increased by the heavy weighted portion 68 of hammer lever 67. Thus hammer lever 67 is caused to swing into a position wherein contact member 72 impinges upon contact member 73. Accordingly, a contact is made for a short predetermined period of time because spring 71 will immediately pull lever 67 against lever arm 62. This particular construction of the pulser shown in Fig. 4 insures that a single electro-magnetic impulse of predetermined time length is created by oscillator 18 or 19 regardless of how long electrical current flows through the solenoid 50 by the actuation of the control stick shown in Figs. 2 and 3.

The electric circuit for the receiving station and associated mechanisms used for controlling a steering apparatus of a vehicle or aircraft is shown diagrammatically in Fig. 5. The receiving station comprises one or more antennae; for the sake of simplicity only two antennae 80 and 81 are shown in Fig. 5, although any number of even circuits, depending upon the number of steering mechanisms to be controlled, may be used. Each of the two antennae 80 and 81 and their associated circuits are adapted to receive one of the two radio signals of different frequencies generated by the electric circuit shown diagrammatically in Fig. 1.

Antenna 80 is tuned in by variable condenser 82 to one of the radio frequency signals generated by the transmitter shown in Fig. 1 and coupled to a radio frequency receiver and detector shown schematically at 84. A triode and associated electric elements may be used to detect and rectify the signal received by antenna 80. One of the two outputs of receiver 84 is connected to ground. The other output of receiver 84 is connected to a sensitive relay 86 which in turn is connected with battery 88 through variable resistor 90. Therefore, when a signal is received from the ground station at antenna 80 the signal is rectified and detected, producing a change in plate current of the triode forming a part of the receiver 84. The change in plate current of the triode of receiver 84 energizes relay 86 which in turn attracts the contact member of switch 92.

Antenna 81 may be tuned in by means of variable condenser 83 to the radio frequency emitted by the other one of the two radio frequency generators shown in Fig. 1. Radio frequency detector 85 receives and detects the signal received by antenna 81. One of the outputs of radio frequency receiver 85 is connected to ground, while the other output of radio frequency receiver 85 is connected with a sensitive relay 87. Relay 87 in turn is connected with battery 88 over variable resistor 91.

It will now be seen that when either receiver 84 or receiver 85 receives a radio signal of a frequency to which it is tuned, either relay 86 or relay 87 will be energized. When relay 86 is energized contacts 92 are closed, while relay 87 will actuate contacts 93.

One arm of contact 92 is connected by wire 94 with relay 96 which is connected by wire 98 with one pole of battery 100. The other pole of battery 100 is connected by wire 102 with the immovable arm of contact 92. Thus, when relay 86 is energized, contact 92 will be closed and battery 100 energizes relay 96 through connections 94, 98 and 102. On the other hand, the movable arm of contact 93 is connected by wire 95 with relay 97. Relay 97 is also connected through line 99 with one pole of battery 100. The circuit from battery 100 is completed through line 103 connecting battery 100 with the immovable arm of contact 93. Accordingly, the energizing of relay 97 will close contact 93 and will complete the electric circuit through relay 97 by means of wires 95, 99 and 103.

When relay 96 is energized, armature 104 is attracted and rotates around its pivot 106. The front end 108 of armature 104 is adapted freely to revolve in a clockwise direction while being prevented by a stop from moving in a counterclockwise direction out of line with armature 104. Armature 105 rotatable about pivot 107 is arranged to be attracted by relay 97 and preferably has a construction similar to the one of armature 104 which therefore need not be explained in detail.

A stepped wheel 110 shown in greater detail in Figs. 6 and 7 cooperates with the two armatures 104 and 105. Wheel 110 is provided on its right hand and left hand sections with steps or teeth 111 and 112. As shown in Fig. 6 contact plates 113 are arranged adjacent the six upper teeth 111, while contact plates 114 are arranged adjacent the six upper teeth 112. Wheel 110 is fixed on shaft 115 rotatably arranged in support 116. Toothed wheel 117 is fixed on shaft 115 and thus revolves with stepped wheel 110. Wheel 117 is provided with a plurality of teeth 118 which are arranged on a section of the outer circumference of wheel 117. The number of teeth 118 on wheel 117 corresponds to the number of teeth 111 or 112 on wheel 110. An elastic spring wire or rod 120 is fastened at 119 on a suitable support not shown in the drawings and is journalled in supporting plate 121. The free end of rod 120 engages with teeth 118 of wheel 117. A spring 122 elastically holds the section of rod 120 between stop 119 and support 121. Thus when stepped wheel 110 is rotated in either direction, spring 120 engaging with teeth 118 prevents stepped wheel 110 from revolving by more than one tooth 118 at a time. The width of teeth 118 on wheel 117 corresponds to the height of the steps 111 and 112 in such a manner that when spring 120 engages the next tooth 118, wheel 110 will also revolve by one tooth 111 or 112.

The operation of stepped wheel 110 will now be evident. A signal received, e. g., by antenna 80 energizes sensitive relay 86 which in turn energizes relay 96. Relay 96 will attract armature 104 which is arranged in such a position that it revolves stepped wheel 110 in a counterclockwise direction by one tooth 112. At the same time spring 120 will engage the next tooth 118 of wheel 117 arranged below the preceding tooth. Supports 121 and 123 are both connected by means of wires 124 and 125 with the positive pole of battery 100, as shown more diagrammatically in Fig. 5. Accordingly, when stepped wheel 110 is revolved in a counterclockwise direction by the action of the signal received by antenna 80, the contact member on support 123 will engage the next contact 114 arranged above the preceding contact.

Similarly, when a signal is received by antenna 81, relay 87 is energized which in turn energizes relay 97 attracting armature 105. The rocking movement of armature 105 revolves stepped wheel 110 by one tooth 111 in a clockwise direction. Accordingly, the contact 113 arranged above the preceding contact now engages with the contact member on support 121. The movements of stepped wheel 110 controlled by the radio signals received by antennae 80 and 81 engage contacts 114 or 113 with the contacts or supports 123 or 121, thus completing an electric circuit including battery 100.

It is an important feature of the present invention that the operation of stepped wheel 110 and its associated circuits is absolutely foolproof. Due to the particular construction of wheel 110 it can only be rotated in either direction up to its predetermined limit.

For this purpose a large recess 109 is formed above the uppermost tooth 111 as well as above the uppermost tooth 112 of stepped wheel 110. When armature 105 is attracted by relay 97, it rotates stepped wheel 110 step by step in a clockwise direction. When the uppermost tooth 111 has been reached, a further downward movement of armature 105 does not cause a rotation of stepped wheel 110 due to recess 109. Similarly, when armature 104 is energized and has rotated stepped wheel 110 to a position engaging the uppermost tooth 112, the further actuation of armature 104 will not cause further rotation of stepped wheel 110.

The closing of these electric circuits energizes a number of solenoids in a manner to be presently described. These solenoids are shown in Figs. 5 and 8 and have been designated with 126, 127, 128, 129, 130, 131, 132, 133 and 134. Solenoids 126 to 134 are adapted to energize armature 135. Armature 135 comprises two non-magnetic ends 136 and 137 which may, for instance, consist of brass. Only the magnetic core 138 is attracted by the magnetic field generated by solenoids 126 to 134. Magnetic core 138 extends over the length of one of the solenoids 126 to 134 and in addition each end portion extends over one half of the length of one of the adjacent solenoids 126 to 134, i. e., core 138 has a length corresponding to two of the solenoids 126 to 134. Armature 135 is connected by means of cord 141 with a control surface such as rudder 140 of a vehicle such as an airplane. Instead of the rudder 140 any other steering mechanism of a vehicle or aircraft may be controlled by the armature 135. Cord 141 is guided over rolls 142.

One end of each of the solenoids 126 to 134 is connected by wires 143 and 144 with the negative pole of battery 100, while the positive pole of battery 100 is connected by means of wires 124 and 125 with the contact members on supports 123 and 121. The electric circuit through each of the solenoids 126 to 134 will now be controlled through contacts 114 or 113 shown in Fig. 6.

When one of the contacts 146, 147, 148, 149, 150, 151, 152, 153 and 154 shown in Fig. 5 is connected with the contact on either support 121 or 123, one of the corresponding solenoids 126 to 134 is energized by battery 100. As shown in Fig. 5 the core 138 or armature 135 is attracted by coil 130 because the two contacts 150 are connected with wires 124 and 125 completing the circuit through battery 100. When a signal is received by antenna 80 thus energizing armature 104, stepped wheel 110 is rotated in a counterclockwise direction and the contact 149 will now be connected with wire 125. Accordingly, solenoid 129 is energized, while coil 130 is deenergized. Therefore, core 138 will move upwards and will rotate control surface 140 in a counterclockwise direction. On the other hand, when a signal is received by antenna 81 armature 105 is energized to rotate stepped wheel 110 in a clockwise direction. Now, contact member 151 will be connected by wire 124 with battery 100 to energize coil 131, while coil 130 will be deenergized. The magnetic field created by coil 131 will attract core 138 which in turn will rotate control surface 140 in a clockwise direction.

It will now be evident that by selectively energizing armatures 104 or 105 and thus rotating stepped wheel 110 in a counterclockwise or clockwise direction the control surface 140 may be stepwise rotated from its original position to any other desired position without first moving the rudder to a normal or inoperative position.

The number of positions to which rudder 140 may be set depends upon the number of solenoids 126 to 134 being nine in the embodiment shown in Fig. 5. The number of contacts 113 and 114 on stepped wheel 110 should correspond to the number of solenoids 126 to 134 used. It must, however, be taken in consideration that two contacts 150 are provided energizing solenoid 130 which sets rudder 140 to its center position. In the ground station the number of contacts 39 and 41 corresponds to the number of positions to which rudder 140 may be set.

It is also feasible to use an even number of different radio frequency signals for controlling a plurality of steering mechanisms. Every pair of radio frequency signals is utilized for controlling the movement of a rudder or the like. The radio transmitting station may be identical to the one shown diagrammatically in Fig. 1, provided, however, that two or more stations such as shown in Fig. 1 are used. Pulsers 16 and 17 of each station generate a different radio frequency.

The radio frequency signals generated by the system of Fig. 1 are received by a receiving station shown diagrammatically in Fig. 9. The receiving station is substantially identical with the one shown in greater detail in Fig. 5. Two steering mechanisms 160 and 161 are shown in Fig. 9. Steering mechanism 160 is controlled by two radio frequency signals received by antennae 162 and 163. The signals received by antenna 162 are received and detected by receiver 164, while the signals received by antenna 163 are detected by receiver 165. Receiver 164 controls two relays indicated at 166 which correspond to relays 86 and 96 of Fig. 5. Similarly, receiver 165 controls relays 167 which may correspond to relays 87 and 97 of Fig. 5. The two relays in turn control the steering control mechanism indicated at 168. Mechanism 168 corresponds to step-by-step wheel 110 and to magnetic core 175 of Fig. 5, controlled by wheel 110.

Rudder 161 is controlled in a similar manner by two sets of radio signals received by antennae 172 and 173, respectively. The signal received by antenna 172 is detected and amplified by receiver 174 which controls relays 176. Similarly, the signal received by antenna 173 is received and detected by receiver 175 controlling relays 177. Relays 176 and 177 selectively control mechanism 178 which is operatively connected with rudder 161. The device operates substantially as described in connection with Fig. 5.

I claim:

1. In a radio transmitting station for the remote control of the steering mechanism of distant apparatus, two pulsers, each of said pulsers including a solenoid, a source of electric current, means to selectively connect each of said solenoids with said current source, a reciprocatable magnetic core within each of said solenoids and arranged to be attracted by said solenoid, a spring biasing said core against the attracting force of said solenoid, a rotatably mounted angle lever, said angle lever being arranged to be rotated by the impact of said core when said core is attracted by said solenoid, a spring biased lever on said angle lever adapted to move away from said angle lever a predetermined distance under the influence of its inertia when said angle lever is rotated, a fixed contact, another contact on said movable lever, said two contacts being adapted to contact each other upon energization of said solenoid for a predetermined length of time.

2. In a system for the remote radio control of the steering mechanism of distant apparatus, a rotatably mounted stepped wheel, means for frictionally breaking said stepped wheel, two armatures arranged to rotate said wheel step by step in either of two directions, means for attracting said armatures, two fixed insulated contacts adjacent said wheel, two series of insulated contacts on said wheel spaced from each other, each of said series of contacts on said wheel contacting one of said two fixed contacts when said wheel is stepwise rotated, a plurality of solenoids, a current source, each of said contacts on said wheel being electrically connected with one of said solenoids, said fixed contacts being connected with said current source, whereby when one of said contacts on said wheel is connected with one of said fixed contacts one of said solenoids is energized by said current source.

3. In a system for the remote radio control of distant apparatus, a maneuvering mechanism, a rotatably mounted wheel, teeth on said wheel, means for frictionally breaking said wheel, two armatures arranged for engagement with the teeth on said wheel, means for selectively engaging one of said armatures with said teeth for rotating said wheel step by step at will in either of two directions, two fixed contacts, two series of insulated contacts on said wheel spaced from each other and adjacent to said teeth, each of said series of contacts on said wheel engaging with one of said two fixed contacts when said wheel is rotated by said armatures, a plurality of solenoids, a source of electric current, each of said contacts on said wheel being electrically connected with one of said solenoids, said fixed contacts being connected with said current source, and means for controlling said maneuvering mechanism in response to the energization of said solenoids.

4. In a radio transmitting station for the remote control of the steering mechanism of distant apparatus, two pulsers, a source of electric current, two contacts, means for selectively connecting each of said pulsers with said current source, each of said pulsers comprising means including an impact actuated rotatable lever arranged for closing one of said contacts for a predetermined duration upon energization of the selected pulser, two means for producing electromagnetic energy of different frequencies, each of said two means for producing electromagnetic energy being electrically connected with one of said contacts, whereby closing of one of said contacts energizes one of said last means for a predetermined duration.

5. A system for the remote control of a distant apparatus comprising a radio transmitting station including two pulsers, a source of electric current, two contacts, means for selectively connecting each of said pulsers with said source of current, each of said pulsers comprising means including an impact actuated rotatable lever for closing one of said contacts for a predetermined duration upon energization of the selected pulser, two means for producing electromagnetic energy of different frequencies, each of said last two means being electrically connected with one of said contacts, whereby closing of one of said contacts energizes one of said last means for a predetermined duration; and a receiving station in said distant apparatus including means for receiving radio signals of a predetermined duration and of two different frequencies, a rotatable body, means for stepwise and selectively rotating said body in either of two opposite directions, said means for rotating said body being responsive to either of said two radio signals, a steering mechanism in said apparatus, and means for controlling said steering mechanism in dependence upon the position of said body.

6. A system for the remote control of a distant apparatus comprising a radio transmitting station including two pulsers, a source of electric current, two contacts, means for selectively connecting each of said pulsers with said source of current, each of said pulsers comprising means including an impact actuated rotatable lever for closing one of said contacts for a predetermined duration upon energization of the selected pulser, two radio frequency generators for producing radio signals of two different frequencies, each of said generators being connected with one of said contacts for energizing one of said two generators upon closing of one of said contacts; and a receiving station in said apparatus including means for receiving radio signals of two different frequencies produced by said two generators, two armatures, each of said armatures being selectively actuated by a radio signal of one of said two frequencies, a rotatably mounted wheel, each of said two armatures being arranged to rotate said wheel in one of two different directions of rotation, sets of solenoids arranged coaxially to each other, a current source, said wheel having spaced means for selectively connecting one solenoid of a set with said current source to cause energization thereof depending upon the position of said wheel, a plurality of steering mechanisms in said apparatus, and means for controlling each of said steering mechanisms in response to the energization of one set of solenoids.

7. A pulser including a solenoid, a battery, an electric switch in circuit with said battery and said solenoid, a magnetic core arranged to be attracted by said solenoid and having a portion arranged to be projected away from said solenoid when said core is attracted by the magnetic force generated by said solenoid, a spring biasing said core against the attracting force of said solenoid, a rotatably mounted angle lever situated in the path of movement of said portion, whereby said angle lever is rotated by the impact of said portion when said core is attracted by said solenoid, a member on said angle lever rotatably connected therewith, a spring biasing said member against said angle lever, a weight on said member, a contact on said member, and a fixed contact arranged to be engaged for a predetermined length of time by the contact on said member when said angle lever is rotated, said member being adapted to move away from said angle lever a predetermined distance under the influence of its inertia and against the action of its spring when said angle lever is rotated.

8. A radio operated system including a maneuvering mechanism, means for receiving and detecting radio signals of two different frequencies, said signals having a predetermined duration, a wheel mounted to rotate in opposite directions, means for stepwise and selectively rotating said wheel in either direction in response to either of said two radio signals, two fixed contacts adjacent said wheel, two series of spaced insulated contacts on said wheel, each of said series of contacts on said wheel contacting one of said two fixed contacts when said wheel is stepwise rotated, a plurality of solenoids arranged coaxially to each other, a current source in circuit with said fixed contacts, each of said contacts on said wheel being electrically connected with one of said solenoids to cause energization thereof in dependence upon the position of said wheel, and means for controlling said maneuvering mechanism in response to the energization of said solenoids.

9. A remote radio control system including a plurality of steering mechanisms, means for receiving and detecting a plurality of radio signals of an even number of different frequencies, each of said signals having a predetermined duration, a plurality of rotatable bodies, means for stepwise and selectively rotating each of said bodies in either of two directions in response to either of two of said radio signals of different frequencies, two fixed contacts arranged adjacent to each of said bodies, two series of spaced insulated contacts on each of said bodies arranged for cooperation with said fixed contacts, sets of solenoids arranged coaxially to each other, a current source in circuit with said fixed contacts, each of the contacts on one of said bodies being electrically connected with one solenoid of a set to cause energization thereof in dependence upon the position of its associated body, and means for controlling each of said steering mechanisms in response to the energization of the solenoids of a set.

10. A radio operated steering mechanism having at least one antenna for receiving radio signals of two different frequencies, means for detecting said radio signals, two relays, means including circuit connections for actuating each of said two relays in response to one of said radio signals of different frequencies, two armatures, each of said relays being arranged to attract one of said armatures, a stepped wheel, each of said two armatures being arranged adjacent said stepped wheel for stepwise rotation thereof in one of two directions, a plurality of solenoids arranged coaxially to each other, a magnetic core slidably arranged within said solenoids for linear displacement by the magnetic force generated by the energization of said solenoids, a current source in circuit with said solenoids, a fixed contactor means, and a switching mechanism on said stepped wheel arranged for cooperation with said contactor means for selectively connecting said current source with one of said solenoids in dependence upon the relative position of said stepped wheel, said magnetic core being connected with said steering mechanism for the control thereof in accordance with the position of said stepped wheel.

11. In a system for the remote control of the steering mechanism of distant apparatus: a transmitting station comprising means for generating signals of an even number of different frequencies, said radio signals having a predetermined duration; a receiving station in said apparatus to be controlled, said receiving station including means for receiving and detecting each of said radio signals of different frequencies; a plurality of steering mechanisms in said apparatus; and a plurality of means, each for rotating step by step one of said steering mechanisms including a stepwise rotatable wheel controlled by said radio signals of two different frequencies, a current source, a plurality of solenoids arranged coaxially and in circuital connection with said current source, a fixed contactor means, and a switching mechanism arranged for cooperation with said contactor means on said wheel for selectively connecting said current source with one of said solenoids in dependence upon the position of said wheel.

12. In a system for the remote radio control of the steering mechanism of distant apparatus; a transmitting station comprising means for generating radio signals of two different frequencies, said radio signals having a predetermined duration; a receiving station in said apparatus to be controlled, said receiving station including means for receiving and detecting each of said radio signals of different frequencies; a steering mechanism in said apparatus; and means for stepwise rotating said steering mechanism in either of two different directions, including a stepwise rotatable wheel controlled in response to said radio signals of two different frequencies, a current source, a plurality of solenoids arranged to coaxially and in circuital connection with said current source, a magnetic core arranged within said solenoids for linear displacement in response to the energization of one of said solenoids, two fixed contacts adjacent said wheel, a plurality of spaced insulated contacts on said wheel arranged for cooperation with said fixed contacts, each of said contacts being in circuit with one of said solenoids for selectively connecting said current source with one of said solenoids in dependence upon the position of said wheel, and means for connecting said magnetic core with said steering mechanism for the control thereof.

KARL A. KOPETZKY.